(12) United States Patent
Holden et al.

(10) Patent No.: US 9,219,947 B2
(45) Date of Patent: Dec. 22, 2015

(54) INDIRECT CONTROL OF CONTENT CONSUMPTION IN AN APPLIANCE

(75) Inventors: Danial Holden, Centennial, CO (US); Michael D. McMahon, Centennial, CO (US); Gregory Allen Broome, Broomfield, CO (US); Weidong Mao, West Windsor, NJ (US); Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 8 days.

(21) Appl. No.: 13/312,475

(22) Filed: Dec. 6, 2011

(65) Prior Publication Data

US 2013/0144969 A1    Jun. 6, 2013

(51) Int. Cl.
G06F 15/16       (2006.01)
H04N 21/472     (2011.01)

(52) U.S. Cl.
CPC ... H04N 21/47202 (2013.01); H04N 21/47211 (2013.01)

(58) Field of Classification Search
CPC .............. H04N 7/16; H04N 21/23805; H04N 65/4084; H04N 21/47202; H04L 67/14
USPC ...................... 725/87, 142, 115; 709/208, 217
See application file for complete search history.

(56) References Cited

U.S. PATENT DOCUMENTS

| 5,991,498 | A * | 11/1999 | Young | 386/297 |
|---|---|---|---|---|
| 6,744,967 | B2 * | 6/2004 | Kaminski et al. | 386/243 |
| 6,904,110 | B2 * | 6/2005 | Trans et al. | 375/350 |
| 6,971,121 | B2 * | 11/2005 | West et al. | 725/142 |
| 7,409,140 | B2 * | 8/2008 | Rodriguez et al. | 386/248 |
| 7,551,832 | B2 * | 6/2009 | Plourde, Jr. | 386/248 |
| 7,590,589 | B2 * | 9/2009 | Hoffberg | 705/37 |

(Continued)

FOREIGN PATENT DOCUMENTS

| CA | 2798314 | 6/2013 |
| EP | 2386975 A2 | 11/2011 |
| EP | 2677756 A1 | 12/2013 |

OTHER PUBLICATIONS

European Search Report issued by the European Patent Office on Nov. 13, 2013 for Patent Application No. EP12195879 filed Dec. 6, 2012 (Applicant—Comcast Corp.; Inventors—Holden, et al.) (7 pages).

(Continued)

*Primary Examiner* — Kevin Bates
*Assistant Examiner* — Clarence D McCray
(74) *Attorney, Agent, or Firm* — Ballard Spahr LLP

(57) ABSTRACT

Aspects of the disclosure relate to control of consumption of content in an appliance. The content can include linear programming and non-linear assets. Such control can permit (i) changing a channel in the appliance (e.g., a CPE without upstream functionality) and thus selecting a linear-programming asset, a non-linear asset, and so forth, and (ii) controlling consumption of such assets. In one aspect, a device with upstream network connectivity can control the consumption of media in the appliance. The device can leverage data management and control functionality of a service provider network to acquire information related to assets available for consumption and to transmit asset requests to the service provider network, which can transmit content and signaling to the appliance in accordance at least in part with the asset request, thus controlling media consumption in the appliance.

21 Claims, 6 Drawing Sheets

(56) References Cited

U.S. PATENT DOCUMENTS

| | | | |
|---|---|---|---|
| 7,657,916 B2* | 2/2010 | Rodriguez et al. | 725/115 |
| 7,765,280 B2* | 7/2010 | Akins, III | 709/219 |
| 7,793,330 B2* | 9/2010 | Rodriguez et al. | 725/142 |
| 7,899,915 B2* | 3/2011 | Reisman | 709/228 |
| 7,926,079 B2* | 4/2011 | Lebar | 725/90 |
| 7,987,491 B2* | 7/2011 | Reisman | 725/112 |
| 8,078,696 B2* | 12/2011 | LaJoie et al. | 709/219 |
| 8,141,123 B2* | 3/2012 | Del Sordo et al. | 725/142 |
| 8,161,172 B2* | 4/2012 | Reisman | 709/228 |
| 8,175,104 B2* | 5/2012 | Connelly et al. | 370/401 |
| 8,181,205 B2* | 5/2012 | Russ et al. | 725/58 |
| 8,612,582 B2* | 12/2013 | Dare et al. | 709/224 |
| 2002/0199185 A1* | 12/2002 | Kaminski et al. | 725/25 |
| 2004/0086120 A1* | 5/2004 | Akins et al. | 380/240 |
| 2004/0221313 A1* | 11/2004 | Depietro et al. | 725/105 |
| 2006/0059095 A1* | 3/2006 | Akins et al. | 705/51 |
| 2006/0277316 A1* | 12/2006 | Wang et al. | 709/231 |
| 2007/0050836 A1* | 3/2007 | Stanek et al. | 725/131 |
| 2007/0087756 A1* | 4/2007 | Hoffberg | 455/450 |
| 2008/0092181 A1* | 4/2008 | Britt | 725/87 |
| 2008/0138033 A1* | 6/2008 | Rodriguez et al. | 386/92 |
| 2008/0209491 A1* | 8/2008 | Hasek | 725/114 |
| 2009/0158375 A1* | 6/2009 | Rodriguez et al. | 725/115 |
| 2009/0216910 A1* | 8/2009 | Duchesneau | 709/250 |
| 2009/0248794 A1* | 10/2009 | Helms et al. | 709/203 |
| 2010/0100940 A1* | 4/2010 | Reynolds | 726/4 |
| 2010/0142448 A1* | 6/2010 | Schlicht et al. | 370/328 |
| 2010/0330979 A1 | 12/2010 | Harris | |
| 2011/0103374 A1* | 5/2011 | Lajoie et al. | 370/352 |
| 2011/0107364 A1* | 5/2011 | Lajoie et al. | 725/25 |
| 2011/0107379 A1* | 5/2011 | Lajoie et al. | 725/87 |
| 2011/0202270 A1* | 8/2011 | Sharma et al. | 701/201 |
| 2012/0101952 A1* | 4/2012 | Raleigh et al. | 705/304 |
| 2012/0106428 A1* | 5/2012 | Schlicht et al. | 370/312 |
| 2012/0124606 A1* | 5/2012 | Tidwell et al. | 725/17 |
| 2012/0303738 A1* | 11/2012 | Gilson | 709/217 |
| 2013/0144969 A1* | 6/2013 | Holden et al. | 709/217 |
| 2014/0096166 A1* | 4/2014 | Gordon et al. | 725/86 |
| 2014/0101708 A1* | 4/2014 | Bradley | 725/95 |
| 2014/0196099 A1* | 7/2014 | Hybertson et al. | 725/88 |

OTHER PUBLICATIONS

Jana R, et al. "Clicker—An IPTV Remote Control in Your Cell Phone", Multimedia and Expo, 2007 IEEE International Conference on, IEEE, PI, Jul. 1, 2007, pp. 1055-1058.

Spangler T. "Cable Show 2010: Comcast Wants to Bring 'Xfinity Remote' to DTAs", May 13, 2010, pp. 1-1, Retrieved from the Internet: URL: http://www.multichannel.com/content/cable-show-2010-comcast-wants-bring-xfinity-remote-dtas [retrieved on Nov. 13, 2013].

\* cited by examiner

INDIRECT CONTROL OF CONTENT CONSUMPTION IN AN APPLIANCE

BACKGROUND

A substantive segment of user devices deployed as part of communication networks can consume digital media in downstream-only modalities, unable to deliver information upstream. While non-interactive consumption of content in such devices generally is satisfactory, interactive consumption of content generally entails upstream delivery of customized information. Consumption of rich digital services (pay-par-view programming, video on demand, digital video recording, etc.) is, therefore, largely unavailable to such devices.

SUMMARY

Some embodiments of the disclosure provide indirect in-band control of consumption of content, such as media, in an appliance. The media can comprise data, music, video, advertisement, service notifications, or the like, and the appliance can be customer premises equipment (CPE), such as an electronic device that is part of a network (e.g., a communication network, a home network, a utilities network, or combinations thereof) having various levels of computational capabilities. In certain embodiments, the electronic device can be a display device without computing functionality that renders a previously decoded signal. In networks such as a broadband packet-switched networks, a cable/fiber optic network or a satellite-based network, the available media can comprise linear-programming assets or non-linear assets, such as per-per-view (PPV) assets or video-on-demand (VOD) assets. The indirect in-band control described herein can permit changing a channel in the appliance (e.g., a device such as CPE without upstream functionality) and thus selecting a linear-programming asset, a non-linear asset, etc. Such control can permit regulating consumption of the linear programming asset or the non-linear asset. To implement the disclosed control of consumption of content in an appliance, a device remote from the appliance, and having upstream network connectivity, can leverage data management and control functionality of a service provider network to acquire information related to assets (linear programming, non-linear assets, management assets, such control functions, etc.) made available for consumption by the service provider. Based on the acquired information, the device can transmit an asset request to the service provider network which can process the asset request. In response, the service provider network can transmit content and signaling to the appliance in accordance at least in part with the asset request, thus controlling media consumption in the appliance.

The disclosed indirect control of media consumption can be effected via in-band signaling. Such functionality can include messaging structure specific to indirect control of a remote appliance, network resource assessment, and selection of suitable pathways for delivery of controlled media. In one aspect, the messaging structure of the disclosure can comprise, for example, a broadcast message that, when processed, can cause the appliance to tune to a desired channel (either a linear-programming channel or a media-on-demand channel). In another aspect, the messaging structure of the disclosure can comprise control messages that, when processed, can regulate consumption (selection of content, rendering modality, etc.) of content (e.g., media content) in the appliance. Such control messages can be transmitted to the appliance in-band, in specific channels pathways, rather than broadcast in a service group. Here, a channel pathway can comprise a virtual channel or a downstream frequency carrier in a channel plan (e.g., a predetermined non-empty set of downstream frequencies available to a service group) associated with the appliance.

Some embodiments of the disclosure can provide several advantages. One exemplary advantage can include broadening the scope of digital services accessed through a low-complexity low-cost CPE by exploiting functionality of a device with upstream connectivity to leverage data management and control functionality of the network that is typically accessed through CPE having more complex functionality. Other exemplary advantages include permitting a more fulfilling interactive user experience, and increased quality of service. Affording rich digital services to such equipment can provide additional revenue opportunities for a network operator.

Additional aspects or advantages of the subject disclosure will be set forth in part in the description which follows, and in part will be obvious from the description, or may be learned by practice of the subject disclosure. The advantages of the disclosure can be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the disclosure and illustrate exemplary embodiments thereof. Together with the description set forth herein and claims appended hereto the annexed drawings serve to explain various principles, features, or aspects of the disclosure.

DETAILED DESCRIPTION

Figure 1:
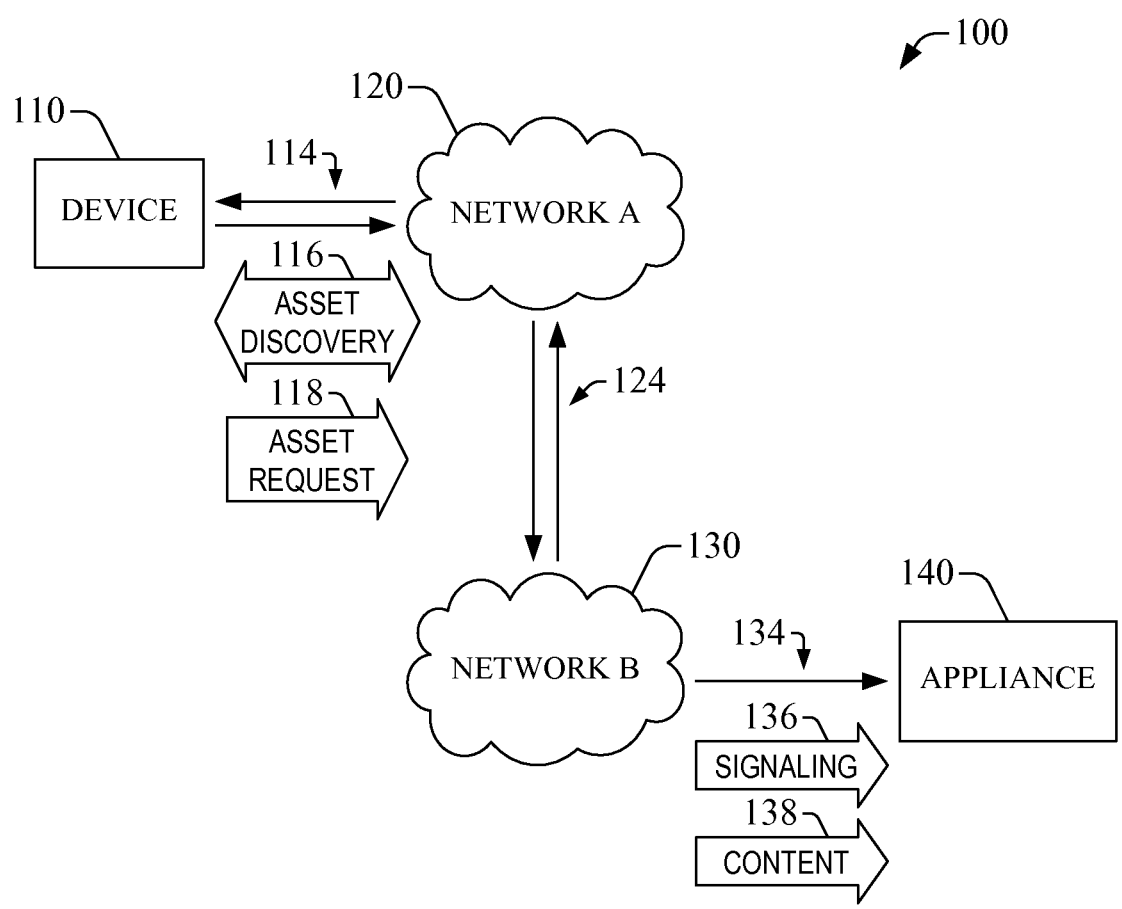
FIG. 1 illustrates an exemplary network environment in accordance with one or more aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the disclosure is not limited to specific systems, articles, apparatuses, and methods for indirectly controlling media consumption at an appliance, such as a CPE. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value.

When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function," "appliance," "controller" and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function," "appliance," "controller" can be utilized interchangeably.

Throughout the description and claims of this specification, the words "comprise," "include," and "having" and their variations, such as "comprising" and "comprises," "including" and "includes," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiment(s) and related aspects of the subject disclosure, example(s) of which are illustrated in the accompanying drawings. Wherever possible, the same reference numbers are used throughout the drawings to refer to the same or like parts.

As described in greater detail below, in one aspect, the disclosure relates to indirect control, e.g., via in-band signaling, of consumption of media in an appliance networked in a first network via a device networked in a second network. The first network and the second network can be communication networks that employ wireless or wired communication links, or both. The communication networks can include one or more of wired networks such as coaxial cable, optical fiber, or mixed networks, broadband packet-switched networks, utility networks, or wireless networks such as macrocellular networks (3GPP Long Term Evolution Networks, 4G, etc.), microcellular networks (e.g., Wi-Fi networks, femtocell networks, etc.), satellite-based networks, or any other type of network. The content or media can include linear programming and non-linear assets. The indirect control described herein can permit changing a channel in the appliance (e.g., one-way customer premises equipment) and thus selecting different linear programming, selecting a non-linear asset, and controlling consumption of the non-linear asset. In certain scenarios, the disclosed indirect in-band control can exploit functionality of a device with upstream connectivity to leverage data management and control functionality of a service provider network. Such functionality can include messaging structure specific to indirect control of a remote appliance, network resource assessment, and selection of suitable pathways for delivery of controlled media.

Referring to the drawings, FIG. 1 illustrates a high-level block diagram of an exemplary network environment in which indirect control of media consumption in an appliance can be implemented in accordance with one or more aspects of the subject disclosure. The exemplary network environment 100 comprises a device 110 functionally coupled (e.g., communicatively coupled via wired and/or wireless link) to a network A 120 which can include wireless networks, wireline networks, and any combination thereof. A data and signaling pipe 114 comprising an upstream link, or uplink (UL), and a downstream link, or downlink (DL), enables functional coupling among the device 110 and the network A 120. The data and signaling pipe 114 can comprise a wireless link or wireline link, or a combination thereof. Device 110 can be embodied in or comprise most any CPE or user device (mobile or otherwise).

As illustrated, network A 120 is functionally coupled to a network B 130 via a data and signaling pipe 124. Network B 130 can include wireless networks, wireline networks, and any combination thereof. In one aspect, network B 130 can be administered (e.g., owned, operated, and/or leased) by a network operator that provides services such as digital television content, internet protocol (IP) video content; digital telephony; data services, such as wide-area network services (e.g., internet service) or home network services (e.g., Wi-Fi access, femtocell access) and the like. The data and signaling pipe 124 can comprise one or more of a reference link, and related components; a conventional bus architecture such as address buses, system buses; a conventional wireline link, such as an Ethernet line, a T-carrier line, a twisted-pair line, or the like; a wireless link, including terrestrial wireless links or satellite-based links, or a combination thereof; and so forth.

Network A 120 and network B 130 can include one or more of wide area networks (WANs), one or more local area networks (LANs), signaling networks (e.g., SS#7), etc.), and so forth. Such networks can operate in accordance with any communication protocol, such as protocols for wireline communication or wireless communication. In certain embodiments, network A 120 can have internal structure, with several functional elements that can provide various operational blocks, such as a backbone network (e.g., a high-capacity packet-switched network), a core network platform, a radio access network, etc. Similarly, in such embodiments, network B 130 also can have internal structure, with various functional elements that can provide at least two main operational blocks: a backbone network (e.g., a high-capacity packet-switched network) and a regional access network (RAN). Both the backbone network and the regional access network (RAN) can be WANs, for example, with the backbone network having a larger geographical scope than the RAN. Network A 120 and network B 130 also can include one or more middleware components that, at least partly in conjunction with data and signaling pipe 124, permit functional coupling among such networks, among other functions.

As illustrated, network 130 can be functionally coupled to an appliance 140 via data and signaling pipe which can comprise a downlink 134 for downstream communication. The appliance 140 can be any device such as customer premises equipment, including an electronic device that is part of a network (e.g., a communication network, a home network, a utilities network, or combinations thereof) and can have various levels of computational capabilities. In certain embodiments, the electronic device can be a terminal display device without computing functionality that renders a previously decoded signal. For example, the appliance 140 can be at least one of a terminal display device, a digital terminal adaptor (DTA), a set top box (STB), an IP-enabled television, a personal computer, and so forth. In one embodiment, DL 134 can transport data and signaling in-band, without availability of an out-of-band channel for signaling. In such embodiment or in an alternative embodiment, appliance 140 can be a one-way device that cannot transmit upstream communications to network B 130.

Consumption of content (linear programming, non-linear assets, etc.) at appliance 140 can be controlled or supplemented through device 110. In one aspect, device 110 can access network B 130 and leverage data management functionality and control functionality provided by the network B 130 and associated with a service (e.g., digital television service) consumed by appliance 140. In one exemplary scenario related to digital television, device 110 can exchange data and signaling with network B 130, via network A 120, as part of an asset discovery 116 in which device 110 can query networks 120 and/or 130, or an asset storage location, for an asset available for consumption, such as media content (music, video, advertisement, notifications (e.g., stock option quotes, location-based services, . . . ), etc.). Assets available for consumption can include content assets and management assets. Here, a content asset can be a linear-programming asset or a non-linear asset. Thus, a content asset of the disclosure can convey content such as media that is part of linear programming or non-linear programming, whereas a management asset provides control functionality that, in response to execution, for example, by a processor, regulates consumption of content. Such control functionality can include changing a channel, advancing content, rewinding content, terminating rendering of content, pausing content streamed live, recording content, and the like. Accordingly, the asset request 118 can comprise a request for a content asset or a management asset.

In response to such query, for example, device 110 can receive data indicative of a plurality of assets available for consumption of media content. Access to such assets can permit, at least in part, device 110 to select a specific asset for consumption. In one aspect, device 110 can deliver an asset request 118 (or a message 118) to network B 130, wherein the asset request 118 can convey a command for consumption of an asset (rendering of a PPV program, pausing a live media streaming, a channel change, etc.) of the plurality of assets. Such command is referred to herein as control request and can include request for content assets and management assets. As described herein, in response, the network 130 can transmit content 138 and/or signaling 136 to the appliance in accordance at least in part with the control request.

In another aspect, device 110 can transmit an asset request 118 that can convey a command for synchronizing a channel pathway for communication of data and/or signaling among the device 110 and the appliance 140. Such command is referred to herein as synchronization request. The channel pathway can comprise a virtual channel or a downstream frequency carrier in a channel plan (e.g., a predetermined non-empty set of downstream frequencies available to a service group) associated with the appliance 140. In response to synchronization request, the network B 130 can configure the virtual channel or the downstream frequency carrier as the channel employed for communicating data and/or signaling from the device 110 to the appliance 140. In an exemplary implementation, by synchronizing such channel pathway among the appliance 140 and the device 110, data or signaling, or both, can be transmitted in-band from the device 110 to the appliance 140, without reliance, for example, on transmissions in all downstream frequencies of a service group associated with the device.

Device 110 can categorize (through use of metadata, for example) the asset request 118 according to at least two message types. As described herein, categorization of the asset request 118 can permit network B 130, or a component therein, to implement indirect control of media consumption at appliance 140 efficiently. In one scenario, device 110 can assign a first identifier (e.g., metadata) to an asset request 118 that conveys a control request. The first identifier can convey that the asset request 118 is a control message. In another scenario, device 110 can assign a second identifier (e.g., metadata) to an asset request 118 that conveys a synchronization request. The second identifier can convey that the asset request 118 is a synchronization message.

In one scenario, a command for consumption of an asset can include a channel change request. As described herein, network B 130 can convey such command to the appliance 140 as part of signaling 136. The channel change request can include a request for a data stream associated with media content being consumed at the appliance 140, the request comprising, for example, a medium access control (MAC) address of the appliance, and at least one of a virtual channel or a frequency carrier in a channel plan that is part of the plurality of assets. In another scenario, a command for consumption of an asset can include an instruction to control a data stream associated with media content being consumed at the appliance 140. The instruction can be at least one of a first instruction to advance the media content associated with the data stream, a second instruction to rewind the media content associated with the data stream, or a third instruction to terminate rendering, at the appliance 140, the media content associated with the data stream.

Device 110 can communicate with network A 120 or network B 130, or both, according to various packet-switching (PS) communication protocols supported by one or more of such networks. For instance, the various packet-switching communication protocols can include one or more of an Ethernet protocol format; an internet protocol (IP) format, such as IPv4 and IPv6, or the like; or a user datagram protocol (UDP) format. Accordingly, in one aspect, device 110 can compose the asset request 118 according to at least one of such protocols.

Figure 2:
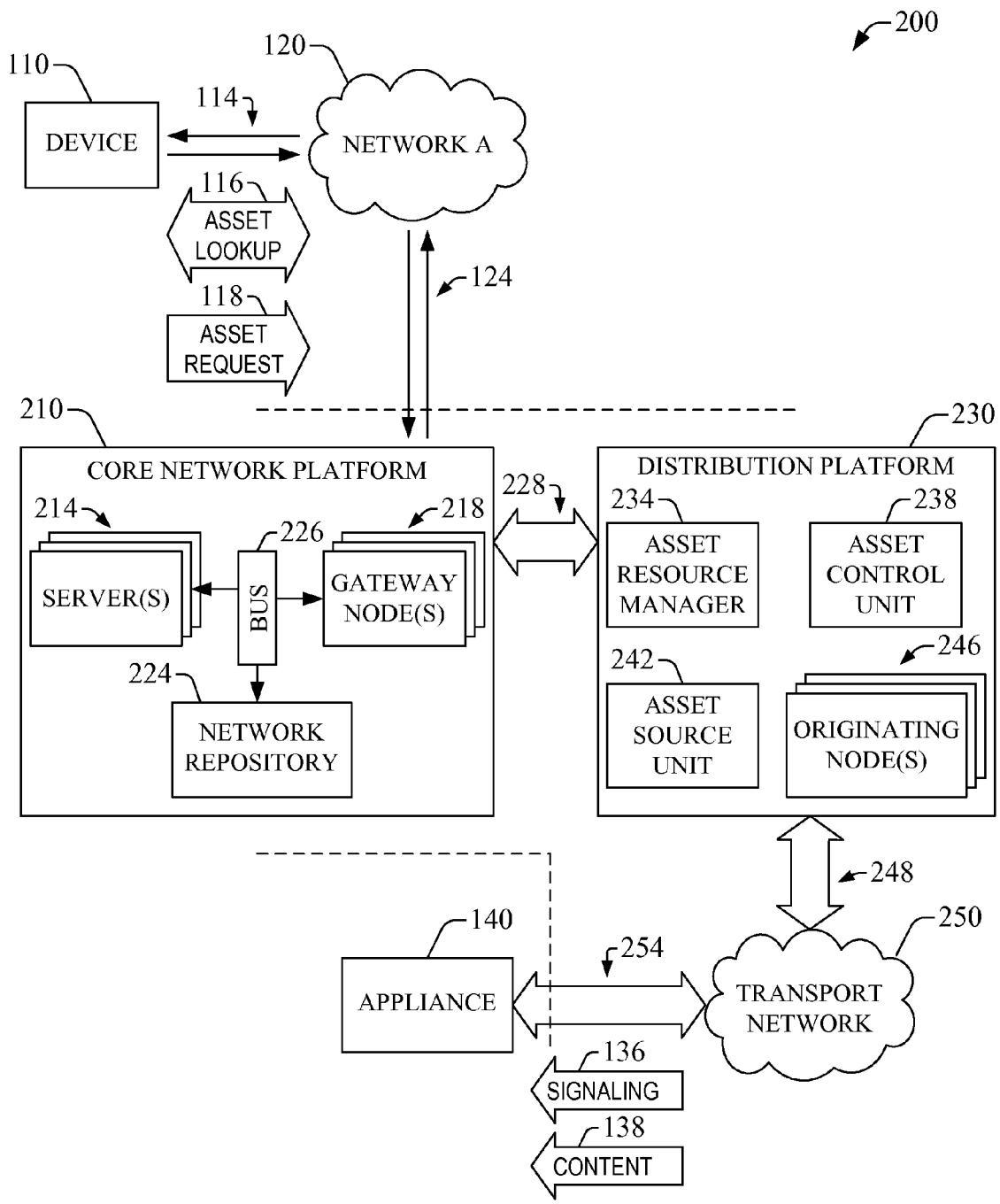
FIG. 2 illustrates an exemplary embodiment of a network in accordance with one or more aspects of the disclosure.

FIG. 2 is a high-level block diagram of an exemplary embodiment 200 of a network in accordance with one or more aspects of the disclosure. The network is network 130 and the boundaries thereof are represented with dashed lines in FIG. 2, to more clearly identify various aspects of the exemplary embodiment 200. In the exemplary embodiment 200, network B 130 comprises a core network platform 210 functionally coupled to a distribution platform 230 through a data and signaling pipe 228. Core network 210 can have a packet-switched (PS) architecture and can serve as a border architecture that permits functional coupling to network A 120. The core network 210 can include various network nodes which can be distinguished according to the functionality thereof. As illustrated, the various network nodes can comprise one or more server(s) 214, one or more gateway node(s) 218, and a network repository 224. While illustrated as a single entity, the network repository 224 can be distributed in order to provide data resiliency and other data management advantages. In addition, while core network platform 210 is illustrated as a single block, in one or more embodiment(s), such platform can be distributed, having a centralized deployment site and a plurality of distributed deployment sites. Functionality and architecture of the one or more server(s) 214, the one or more gateway node(s) 218, and the network repository 224 can be specific, yet not exclusive, to the particular embodiment of the core network 210. For instance, in an exemplary embodiment in which the core network is an IMS network, network repository 224 can be a home subscriber server (HSS); server(s) 214 can comprise application server(s), and specific function control nodes (e.g., Call Session Control Functions (CSCFs), such as serving CSCF (S-CSCF) and interrogating CSCF (I-CSCF)) and proxy servers; and gateway node(s) 218 can comprise a breakout gateway control function (BGCF), a media gateway (MGW) and a signaling gateway (SGW), and media gateway control function (MGCF).

Network nodes, or network elements, in core network 210 can be functionally coupled through a bus 226, which enables exchange of information (e.g., data or signaling, or both) among server(s) 214, gateway node(s) 218, and network repository 224. Bus 226 can include a plurality of reference links (Cx, Cr, Dh, Dx, Gm, Ma, Mg, etc.), and related components, and conventional bus architectures such as address buses, system buses, and the like.

Distribution platform 230 can comprise one or more signal processing component(s) (such as asset resource manager 234, asset control unit 238, and asset source unit 242, and other components not shown) that can receive and operate on an information stream, such as a data stream, a signaling stream, or a combination thereof. In one aspect, such component(s) can perform one or more operations on the information stream, such encoding, modulation, multiplexing, up-conversion, combination, and the like. Architecture of distribution platform 230 can be specific to the implemented modality exploited for transmission of the information stream. Such modality can include wired delivery or wireless delivery, and specific protocols for transmission of information such as packet-switched communication, circuit-switched communication, or the like. In one embodiment, at least one of such signal processing component(s) can embody a termination system (TS), such as, in one type of network, a cable modem termination system (CMTS). In another embodiment, at least one of the one or more signal processing components of distribution platform 230 can embody a network router or a network switch (e.g., a digital subscriber line access multiplexer (DSLAM)) for transmission of information streams based on a PS communication protocol, such as internet protocol (IP) (e.g., IPv4 or IPv6). As illustrated, the distribution platform 230 can comprise a group of one or more originating node(s) 246 that can transmit the information stream. In certain embodiments, each originating node of the group of one or more originating node(s) 246 can embody an edge quadrature amplitude modulation (QAM) node. In other embodiments, each edge originating node of the group of one or more originating node(s) 246 can embody a device that consolidates the functionality of a termination system (e.g., a CMTS) and an edge QAM node. In other embodiments, each originating node of the group of one or more originating node(s) 246 can embody a network router (e.g., a broadband remote access server (BRAS)) or network switch (e.g., a DSLAM) for transmission of information streams based on a PS communication protocol (e.g., internet protocol). While illustrated as a single block, in one or more embodiment(s), distribution platform 230 can be distributed, having a centralized deployment site (or plant) and a plurality of hub sites (also referred to as sites). In such embodiment(s), each one of the hub sites can comprise an edge originating node of the group of one or more edge originating node(s) 246.

Distribution platform 230 can receive data (data flows, audio signals, video signals, any combinations thereof, etc.) and signaling (control instructions, clock signals, etc.) from a functional element that is, for example, part of core network platform 210 or that is functionally coupled thereto. In one scenario, the functional element can be a server that supplies a combination of audio signal and video signal, such as an audiovisual signal comprising a video asset. The server can be, for example, a content server for pay-per-view programming or video-on-demand assets, an application server, a data server, a telephony server, a backbone network router, or the like. In such scenario, based on the formatting of the audiovisual signal, one or more signal processing component(s) (not shown) in the distribution platform 230 can process (encode, encrypt, modulate, multiplex, up-convert, combine) the audiovisual signal and supply a resulting audiovisual signal to an edge originating node of the group of one or more originating node(s) 246. An originating node can transmit a plurality of P (a natural number) data streams, conveying at least a portion of the audiovisual signal. It should be appreciated that in certain embodiments, the edge originating node can operate on the audiovisual signal without reliance on such one or more signal processing component(s). In another scenario, a source node (e.g., a satellite transceiver coupled to an asset source) coupled to the distribution platform 230 can generate an audiovisual signal, which can be processed by one or more processing component(s) and supplied to an edge originating node of the one or more originating node(s) 246. Such edge originating node can transmit a plurality of P data streams conveying at least a portion of the audiovisual signal.

A gateway node of the one or more gateway node(s) 218 can receive the asset request 118 and relay it to an asset resource manager 234 (e.g., a session resource manager (SRM) server) that is part of the distribution platform 230. In another implementation, a server (e.g., a proxy server) of the one or more server(s) 214 can receive the asset request 118 and relay it to the asset resource manager 234. As described herein, the asset request 118 can be a message that conveys a request for a first data stream associated with media content. In one aspect, the request can comprise one or more of at least one logical address (e.g., a medium access control (MAC) address, or an internet protocol (IP) address) associated with the appliance 140, or at least one of a virtual channel or a frequency carrier in a channel plan available for delivery of the media content. The logical address can be a unique address or a non-unique address, such as an address corresponding to a group of addresses. In another aspect, the asset request 118 can be a control message comprising an instruction to control a data stream (e.g., a multi-program transport stream (MPTS)) associated with a non-linear media asset (or, more generally, media content) wherein the instruction can be at least one of a first instruction to render the data stream, a second instruction to advance rendering of media content (e.g., a fast-forward instruction) related to the data stream; a third instruction to retreat the rendering of media content (e.g., a rewind instruction) related to the data stream; or a fourth instruction to terminate rendering the media content (e.g., a stop instruction) related to the data stream.

Figure 3:
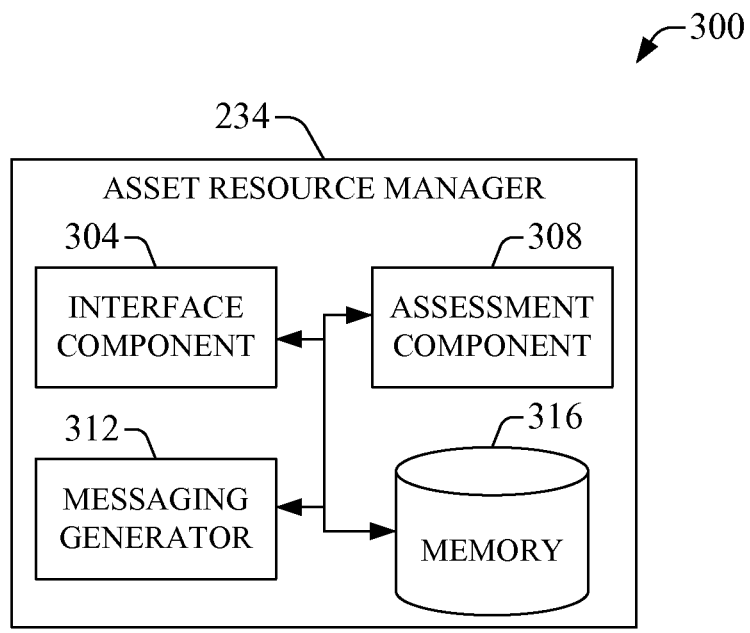
FIGS. 3-4 illustrate an exemplary embodiment of a network node in accordance with one or more aspects of the disclosure.

The asset resource manager unit 234 (also referred to as asset resource manager 234) can receive at least one message for one or more appliances (e.g., appliance 140), and can supply the at least one message to the one or more appliances. In one scenario, the at least one message can comprise a plurality of asset requests received from respective devices that are configured to indirectly control consumption of media through an appliance. As described herein, each message of the at least one message can convey a command for consuming media content through an appliance (e.g., appliance 140) of the one or more appliances. For a message that is a control message, in one implementation, the asset resource manager 234 can substantially continuously or semi-continuously supply (e.g., process and transmit) the control message to the appliance (e.g., the appliance 140) while a delivery criteria is fulfilled and, in response, the appliance can perform a specific action such as rendering indicia indicative of the control message. To at least such end, the asset resource manager 234 can retain a replica of the control message in a memory that is part of or functionally coupled to the asset resource manager 234. Such replica can be retained while a delivery criterion is fulfilled. The substantially continuous or semi-continuous transmission of the control message can be effected in-band. As an illustration, the control message can be an instruction to fast forward a video asset being rendered in a display device functionally coupled to a set-top box (e.g., appliance 140). In such case, the asset resource manager 234 can substantially continuously deliver the fast forward instruction (conveyed as part of signaling 136, for example) to the set-top box until normal rendering of the video asset is resumed (which can be an example of a delivery criterion). In response to receiving the fast-forward instruction substantially continuously, the set-top box can cause the display device to render indicia (e.g., a logo) indicative of the rendering of the video asset being advanced. In certain embodiments, such indicia can be received as part of content 138. In one embodiment, e.g., exemplary embodiment 300 illustrated in FIG. 3, the asset resource manager 234 can include an interface component 304 to receive an asset request 118, and to supply content 138 or signaling 136 to the appliance 140 (which, as illustrated above, can be a set-top box) in response to the asset request 118.

As described herein, the appliance 140 can receive in-band signaling without an out-of-band (OOB) channel. Accordingly, a plurality of asset requests can be transmitted through available downstream frequency carriers available for delivery of data. In addition, the various transport streams (e.g., SPTSs, MPSTs) that can be consumed through deployed appliances (e.g., appliance 140) can have different amounts of available bandwidth overhead. Thus, in one aspect, prior to transmission of an asset request (e.g., asset request 118) to an appliance, the asset resource manager 234 can determine an amount of network resources (e.g., bandwidth) available for delivery of an asset request (e.g., a control message, a synchronization message). In one aspect, the asset resource manager 234 can assign a first priority to an asset request that is a control message, and a second priority to an asset request that is a synchronization message. In certain implementations, the first priority can be higher than the second priority, since a synchronization message can be delivered at a lesser rate than control messages (e.g., channel change requests). The synchronization message can be delivered at the lesser rate in view that, for example, the synchronization message is utilized once per viewing session and is transmitted to all downstream frequency channels in a service group associated with the appliance (e.g., appliance 140). Thus, communication of the synchronization message can consume a substantive amount of available bandwidth.

Based at least on the amount of such resources, the asset resource manager 234 can supply (e.g., process and transmit) the asset request. To at least such end, in one implementation, the asset resource manager 234 can combine the asset request (which can be referred to as a message) with other asset request(s). The extent of the combination of the asset request with the other asset request(s) can be established by the amount of network resources. In one aspect, the asset request can be combined with other asset requests according to categories. For example, when the asset request is a control message requesting a channel change to a specific channel, the control message can be combined with another asset request that is a channel request directed to the specific channel. In another aspect, the asset request can be combined with other asset request(s) according to the addresses of the appliances that are intended to receive the combined asset requests. For example, when the asset request is a control message requesting a specific programming, the asset request can be combined with other asset request(s) requesting such specific programming for other appliance(s). Thus, the combined asset request can be composed according to the addresses of the controlled appliances. Combining asset requests according to addresses can increase efficiency of message delivery, particularly, yet not exclusively, for unique addresses, since a substantive portion of the unique addresses address associated with the appliances being controlled are likely to be similar. In yet another aspect, the asset request can be combined with other unrelated asset request(s) to adjust to a minimum packet size (e.g., an MPEG packet size) and thus mitigate or avoid having data packet(s) padded with null bits. In addition or in the alternative, based on the amount of network resources (e.g., spectral bandwidth), the asset resource manager 234 or a functional element coupled thereto, such as an originating node of the one or more originative node(s) 246, can operate on at least one transport stream being distributed by the distribution platform 230 in order to increase the available network resources.

In certain embodiments, such as exemplary embodiment 300, asset resource manager 234 can comprise an assessment component 308 to evaluate the network resources available for transmission of a plurality of asset requests, and a messaging generator unit 312 (also referred to as messaging generator 312) to supply at least one asset request. In certain implementations, the assessment component 308 can operate on one or more transport streams to increase network resources (e.g., available bandwidth) for delivery of asset request(s).

In scenarios in which device 110 is intended to control consumption of a transport stream conveying a non-linear asset, such transport stream can generally be transmitted in a specific service group (e.g., a portion of downstream spectrum comprising one or more narrowcast channels) associated with the appliance 140. Distribution platform 230 can comprise an asset control unit 238 that can discover a service group associated with the appliance and deliver an asset request (e.g., a control message or a synchronization message) to the appliance. In addition or in the alternative, for asset requests (e.g., a control message) that select a specific non-linear asset (e.g., media-on-demand), the asset control unit 238 can determine a suitable format (e.g., video compression, video resolution, or the like) for transmission of the non-linear asset (or, more generally, data indicative of such asset) based on functional capability (computing power, processor clock, etc.) of the appliance 140. For example, in one aspect, asset control unit 238 can transmit signaling indicative of the suitable format to an asset source unit 242, which can provision and deliver the non-linear asset in such format. As an example, for an appliance 140 that is a digital terminal adaptor, the asset control unit 238 can establish that delivery of a non-linear asset be effected through a first delivery pathway comprising an originating node (e.g., an edge QAM) whereas for an appliance that is a computing device with suitable resources, the asset control unit 238 can determine that delivery of the non-linear asset be effected through a second delivery path comprising an originating node that can be a termination system, such as a cable modem termination system. Other implementations are contemplated in which the first pathway can comprise a first network router or network switch for PS communication, and the second pathway can comprise a second network router or network switch for PS communication. The first pathway and the second pathway both include data and signaling pipe 248, various functional elements of transport network 250 (e.g., an HFC network, a broadband network such as a digital subscriber line (DSL) network, or the like) and data and signaling pipe 254.

The transport network 250 can be a WAN that can be embodied in a wireless network, a wireline network, or a combination thereof, and supplies data service(s), such as television programming, video on demand, Internet service, packet-switched data or telephony, to a user location which can be stationary (e.g., a location of a CPE) or mobile (e.g., a location of mobile device). In certain implementations, transport network 250 can be embodied in an optic fiber network, a coaxial cable network, a hybrid fiber coaxial (HFC) network, or a wireless network comprising terrestrial wireless links and deep-space links (e.g., satellite links), or any combination thereof. As an illustration, in an embodiment in which the transport network 250 is an HFC network, data pipe and signaling 248 can comprise several optic fiber links and associated optical functional elements, such as downstream lasers, light amplifiers, last-mile fiber aggregator node, and the like. In addition, in such embodiment, transport network 250 can comprise various RF amplifiers and coaxial taps to respective dwellings (e.g., a stationary user location) wherein customer premises equipment (CPE), such as appliance 140, can consume a data service provided through distribution platform 230. In such embodiment, the CPE can be functionally coupled to a cable modem or other device that serves as the network gateway to the dwelling network from the transport network 250. As another illustration, in an embodiment in which the transport network 250 is a wired broadband PS network, data pipe and signaling 248 can comprise Ethernet links, and can include network routers such as BRASs and network switches, such as DSLAMs. The network switches can be functionally coupled to home gateways (e.g., DSL modems) in dwellings in which CPE (e.g., appliance 140) consume data services provided through distribution platform 230.

In certain embodiments, transmission of a channel change request can be mitigated or avoided. For example, for users who desire to control their appliances (e.g., a one-way box) with an internet-based device through a switched digital video (SDV) QAM node or a network router or network switch for PS protocol (e.g., IP) communication (both of which can be part of, for example, the one or more originating node(s) 246, channel change requests can be mitigated or avoided for linear-programming channels. Accordingly, in such scenario, insertion of discrete channel change requests into QAM downstream channels or downstream channels for PS communication can be prevented or avoided. Reducing insertion of discrete channel requests into QAM downstream channels or downstream channels for PS communication can be advantageous in embodiments in which an amount of available network resources (bandwidth, bitrate, etc.) overhead cannot be controlled through a component, such as asset resource manager 234, that operates on transport streams in order to increase such overhead.

The indirect control of an appliance (e.g., appliance 140), via, for example, the SDV QAM node or a network router or a network switch for PS protocol communication, can be more efficiently implemented in scenarios having a small population of users per originating node. In one aspect, a re-pair channel change message can be transmitted on most all QAM or IP downstream channels or downstream channels for PS communication at least once indicating an appliance (e.g., a DTA coupled to a television set) to access, for example, a specific SDV QAM node or a specific network router or a specific network switch for PS protocol communication for media content consumption. Here, the re-pair channel change message can configure, for example, a pair of the form (SDV QAM node, program number) or (IP switch, program number), wherein the program number is associated with the linear channel that transports media content. As indicated previously, the specific SDV QAM node or specific network router or specific network switch for PS protocol communication can, for example, be part of distribution platform 230. In response to transmitting (e.g., broadcasting) such re-pair channel change message, the distribution platform 230 (e.g., a local headend or hub) can control, via asset resource manager 234, for example, the amount of network resources overhead that is available. Such overhead can be associated with the small number of user devices (e.g., appliance 140) that can consume (e.g., receive) content through, for example, the specific SDV QAM node or the specific network router or the specific network switch for PS protocol communication.

In a scenario in which a user is watching a first linear channel through, e.g., a specific SDV QAM node, and a second linear channel the user desires to watch is not being transmitted (e.g., broadcast) on any SDV QAM node at an SDV system (not shown), transmission of a channel change request still can be avoided. Here, the first linear channel can have a specific program number associated therewith, and watching a linear channel refers to consuming media content, such as linear programming content, being transported (or transmitted) in the linear channel. The SDV system, which can, for example, be part of distribution platform 230, can change the linear program (e.g., linear media content) being transmitted on the specific pair (SDV QAM node, program number), causing the appliance, such as a DTA coupled to a television set, to render the desired linear program associated with the second linear channel the user desires to watch. In one aspect, such change among linear programs can result in a substantially instantaneous channel change. In another aspect, in an implementation in which, for example, the SDV system (not shown) has memory storage (e.g., a buffer) available for the SDV channel associated with an SDV QAM node, delivery of linear programming through, e.g., the SDV QAM node can be provided with live buffer support, which may not be supported by a one-way appliance such as a DTA. In an additional or alternative scenario in which the first linear channel is consumed through, for example, a specific network router or a network switch for communication, and the second linear channel is not transmitted on any network router or network node in a local distribution hub associated with such node or router, transmission of a channel change request to switch to the second channel can be avoided in substantially the same manner as described hereinbefore. In one aspect, the local distribution hub, or a suitable content delivery system therein, can change the linear program being transmitted in the specific network router or specific network switch), causing the appliance, such as a DTA coupled to a television set, to render the desired linear program associated with the second linear channel the user desires to watch. Such system can, for example, support live buffering through memory, or more generally computer-readable media, available to the specific network router or specific network switch.

Figure 4:
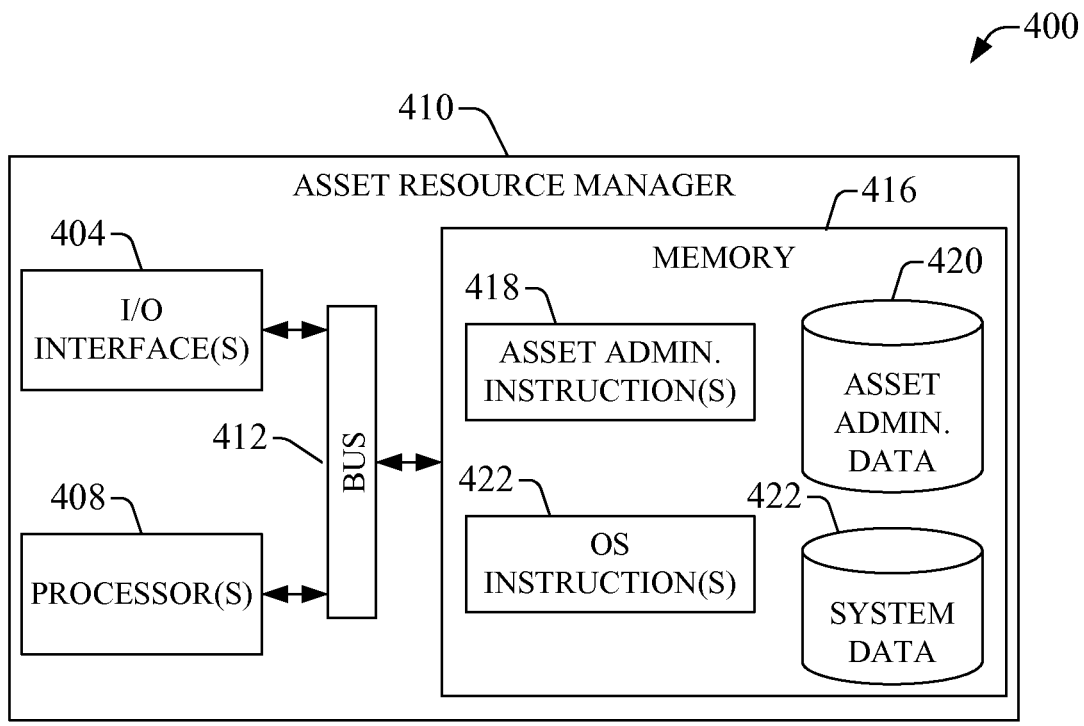

FIG. 4 is a block diagram of an exemplary embodiment 400 of an asset manager 410 that enables indirect control of media consumption at an appliance in accordance with one or more aspects of the subject disclosure. In the illustrated embodiment, asset resource manager 410 comprises one or more input/output (I/O) interface(s), one or more processor(s) 408, a memory 416, and a bus 412 that functionally couples various system components including the one or more processor(s) 408 to the memory 416. In the case of multiple processors comprising the group of processors 408, the asset resource manager 410 can exploit concurrent computing.

The functionality of asset resource manager 410 can be configured by a group of computer-executable instructions (e.g., programming code instructions or programming modules) that can be executed by a processor of the one or more processor(s) 408. Generally, programming modules can comprise computer code, routines, objects, components, data structures (e.g., metadata objects, data object, control objects), and so forth that can be configured (e.g., coded or programmed) to perform a particular action or implement particular abstract data types in response to execution by the processor.

Any number of programming code instructions or program modules can be retained in memory 416. Data and computer-accessible instructions, e.g., computer-readable and computer-executable instructions related to asset administration, as described herein, can be retained in memory 416. In one aspect, a memory element which is represented as the asset administration data 420, can comprise a variety of data and metadata related to indirect control of media consumption in an appliance (e.g., appliance 140) in accordance with aspects of the disclosure. In another aspect, one or more asset administration instruction(s) can be retained in memory 416 as a memory element which is represented as the block asset administration instruction(s) 418. In the subject specification and annexed drawings, memory elements are illustrated as discrete blocks, however, such memory elements and related computer-executable instructions and data can reside at various times in different storage elements (registers, files, memory addresses, etc.; not shown) in memory 416. In yet another aspect, asset administration instruction(s) 418 are stored as an implementation (e.g., a compiled instance) of one or more computer-executable instructions that implement and thus provide at least the functionality of the methods described herein. Asset administration instruction(s) 418 also can be transmitted across some form of computer readable media.

Memory 416 can be embodied in a variety of computer-readable media. Exemplary computer-readable media can be any available media that is accessible by a processor in a computing device, such as one of the one or more processor(s) 408 in the asset resource manager 410, and comprises, for example, both volatile and non-volatile media, removable and non-removable media. As an example, computer-readable media can comprise "computer storage media," or "computer-readable storage media," and "communications media." Such storage media can be non-transitory storage media. In the subject specification and annexed drawings, "computer storage media" can comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer or a processor therein or functionally coupled thereto.

In one aspect, memory 416 can comprise computer-readable media in the form of volatile memory, such as random access memory (RAM), or non-volatile memory, such as read only memory (ROM). In one aspect, memory 416 can be partitioned into a system memory (not shown) that can contain data and/or programming modules that enable essential operation and control of asset resource manager 410. Such program modules can be implemented (e.g., compiled and stored) in memory element 422, referred to as operating system (OS) instruction(s), whereas such data can be system data that is retained in memory element 424, referred to as system data. The OS instruction(s) 422 and system data 424 can be immediately accessible to and/or are presently operated on by at least one processor of the one or more processor(s) 408. Operating system 422 can comprise OSs such as Windows operating system, Unix, Linux, iOS and substantially any operating system for tethered computing devices. In another aspect, memory 416 can comprise other removable/non-removable, volatile/non-volatile computer non-transitory storage media. By way of example, memory 416 can include a mass storage unit (not shown) which can provide non-volatile storage of computer code, computer readable instructions, data structures, program modules, and other data for the computing device 410. As an example, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

In various embodiments of the disclosure, the indirect control of media consumption at an appliance effected in the disclosed systems and methods can be performed in response to execution of software components (e.g., one or more implementations of asset administration instruction(s) 418) by a processor or computing device. In particular, yet not exclusively, to provide specific functionality of network node 410, a processor of the one or more processor(s) 408 in network node 410 can execute at least a portion of asset administration instruction(s) 418, consuming asset administration data 420 in accordance with aspects of the subject innovation.

In general, a processor of the one or more processor(s) 408 refers to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the one or more processor(s) 408 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage or enhance performance of the computing devices that can implement the various aspects of the subject disclosure. In another aspect, the one or more processor(s) 408 can be implemented as a combination of computing processing units.

The one or more input/output (I/O) interface(s) 404 can functionally couple (e.g., communicatively couple) asset resource manager 410 to another functional element of distribution platform 230 described herein.

In certain embodiments, the one or more I/O interface(s) 404 can include at least one port that can permit connection of the asset resource manager 410 to peripheral devices, network adaptors such as those present in reference links, and other network nodes. In one aspect, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like.

At least one I/O interface of the one or more I/O interface(s) 404 can enable delivery of output (e.g., output data, output signaling) to another network node (either intra-network node or inter-network node) or a peripheral device. Such output can represent an outcome, or result, of implementation of a method described herein or action that is part of such method. In another aspect, such output can be any representation (textual, graphical, aural, etc.) of data or signaling resulting from implementation (e.g., execution) of the methods (or processes) for indirectly controlling media consumption at a remote appliance in accordance with aspects of the disclosure.

Bus 412 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like.

Figure 5:
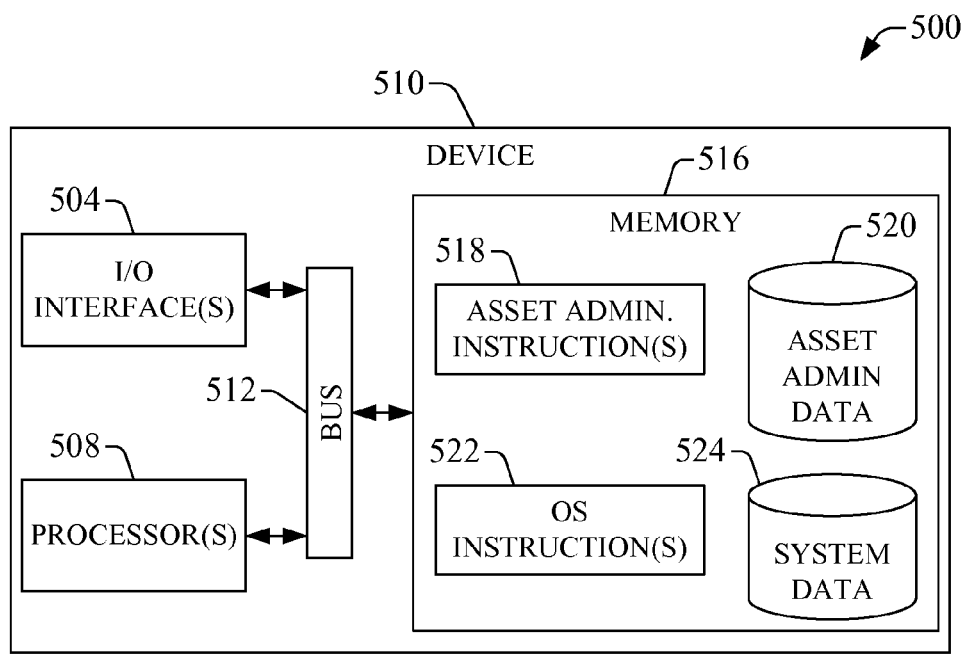
FIG. 5 illustrates an exemplary embodiment of a device in accordance with one or more aspects of the disclosure.

FIG. 5 illustrates an exemplary embodiment 500 of a device for indirect control of media consumption at appliance in accordance with aspects of the subject disclosure. The device 510 can embody device 110 described herein. In the illustrated embodiment, device 510 comprises one or more input/output (I/O) interface(s), one or more processor(s) 508, a memory 516, and a bus 512 that functionally couples various system components including the one or more processor(s) 508 to the memory 516. In the case of multiple processors comprising the group of processors 508, the device 510 can exploit concurrent computing.

The functionality of the device 510 can be configured by a group of computer-executable instructions (e.g., programming code instructions or programming modules) that can be executed by a processor of the one or more processor(s) 508. Generally, programming modules can comprise computer code, routines, objects, components, data structures (e.g., metadata objects, data object, control objects), and so forth, that can be configured (e.g., coded or programmed) to perform a particular action or implement particular abstract data types in response to execution by the processor.

Any number of programming code instructions or program modules can be retained in memory 516. Data and computer-accessible instructions, e.g., computer-readable and computer-executable instructions, related to asset administration as described herein can be retained in memory 516. In one aspect, a memory element which is represented as the asset administration data 520, can comprise a variety of data and metadata related to indirect control of media consumption in an appliance (e.g., appliance 140) in accordance with aspects of the disclosure. In another aspect, one or more asset administration instruction(s) can be retained in memory 516 as a memory element which is represented as the block asset administration instruction(s) 518. In the subject specification and annexed drawings, memory elements are illustrated as discrete blocks, however, such memory elements and related computer-executable instructions and data can reside at various times in different storage elements (registers, files, memory addresses, etc.; not shown) in memory 516. In yet another aspect, asset administration instruction(s) 518 are stored as an implementation (e.g., a compiled instance) of one or more computer-executable instructions that implement and thus provide at least the functionality of the methods described herein. Asset administration instruction(s) 518 also can be transmitted across some form of computer readable media.

Memory 516 can be embodied in a variety of computer-readable media. Exemplary computer-readable media can be any available media that is accessible by a processor in a computing device, such as one of the one or more processor(s) 508 in the device 510, and comprises, for example, both volatile and non-volatile media, removable and non-removable media. As an example, computer-readable media can comprise "computer storage media," or "computer-readable storage media," and "communications media" in accordance with features described herein. Such storage media can be non-transitory storage media.

In one aspect, memory 516 can comprise computer-readable media in the form of volatile memory, such as random access memory (RAM), or non-volatile memory, such as read only memory (ROM). In one aspect, memory 516 can be partitioned into a system memory (not shown) that can contain data and/or programming modules that enable essential operation and control of device 510. As described herein, such program modules can be implemented (e.g., compiled and stored) in memory element 522, referred to as operating system (OS) instruction(s), whereas such data can be system data that is retained in memory element 524, referred to as system data. The OS instruction(s) 522 and system data 524 can be immediately accessible to and/or are presently operated on by at least one processor of the one or more processor(s) 508. Operating system 522 can comprise OSs such as Windows operating system, Unix, Linux, iOS and substantially any operating system for wireless or tethered computing devices. In another aspect, memory 516 can comprise other removable/non-removable, volatile/non-volatile computer non-transitory storage media. By way of example, memory 516 can include a mass storage unit (not shown) which can provide non-volatile storage of computer code, computer readable instructions, data structures, program modules, and other data for the device 510. As an example, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

In various embodiments of the disclosure, the indirect control of media consumption at an appliance effected in the disclosed systems and methods can be performed in response to execution of software components (e.g., one or more implementations of asset administration instruction(s) 518) by a processor or computing device. In particular, yet not exclusively, to provide specific functionality of device 510, a processor of the one or more processor(s) 508 in device 510 can execute at least a portion of asset administration instruction(s) 518, consuming asset administration data 520 in accordance with aspects of the disclosure.

In general, a processor of the one or more processor(s) 508 refers to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the one or more processor(s) 508 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage or enhance performance of the computing devices that can implement the various aspects of the subject disclosure. In another aspect, the one or more processor(s) 508 can be implemented as a combination of computing processing units.

The one or more input/output (I/O) interface(s) 504 can functionally couple (e.g., communicatively couple) device 510 to another functional element of network A 120 described herein, and thereby functionally couple the device 510 to the distribution platform 230 via the core network platform 210.

In certain embodiments, the one or more I/O interface(s) 504 can include at least one port that can permit connection of the device 510 to peripheral devices, network adaptors such as those present in reference links, and other network nodes. In one aspect, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like.

At least one I/O interface of the one or more I/O interface(s) 504 can enable delivery of output (e.g., output data, output signaling) to another computing device or a peripheral device. Such output can represent an outcome, or result, of a method or action performed at the device 510. In one aspect, the output can comprise at least one message related to routing an emergency call under a fault condition at an emergency services network. In another aspect, such output can be any representation (textual, graphical, aural, etc.) of data or signaling resulting from implementation (e.g., execution) of the methods (or processes) for controlling consumption of media at an appliance (e.g., appliance 140) that is remote to the device 510. A representation of such data and signaling can be determined, at least in part, by a specific end-user interface employed controlling consumption of media at the appliance.

Bus 512 represents one or more of several types of bus structures, including a memory bus or memory controller, a peripheral bus, an accelerated graphics port, and a processor or local bus using any of a variety of bus architectures. As an example, and similarly, yet not identically, to bus 412, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like.

Figure 6:
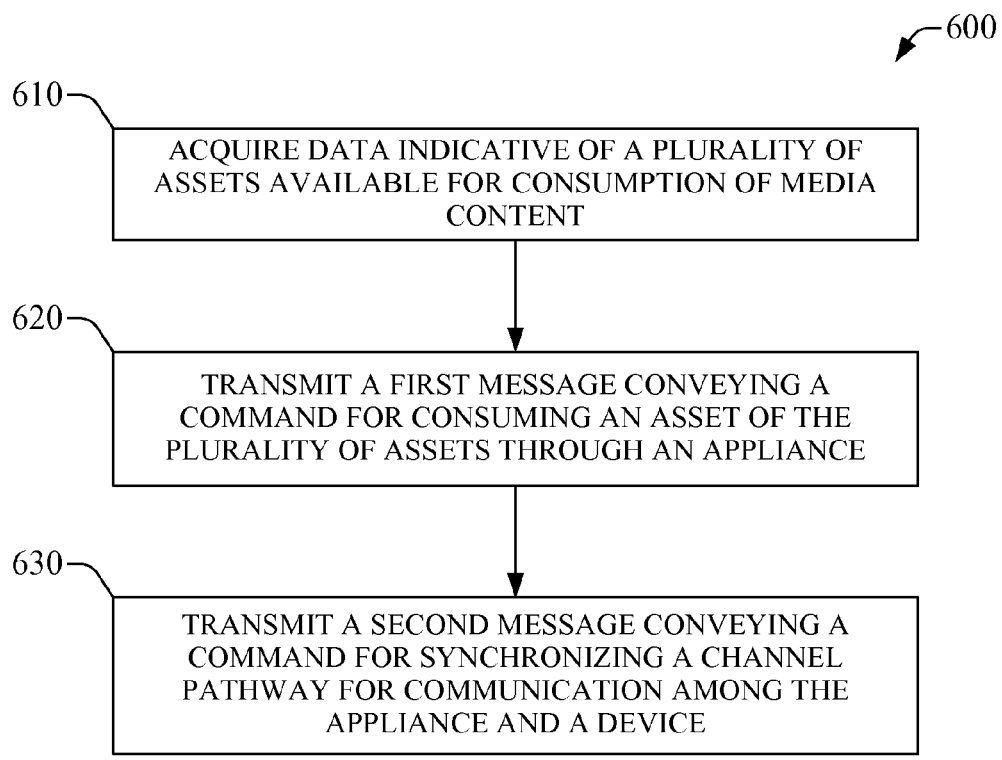
FIGS. 6-8 illustrate exemplary methods according to one or more aspects described herein.
Figure 7:
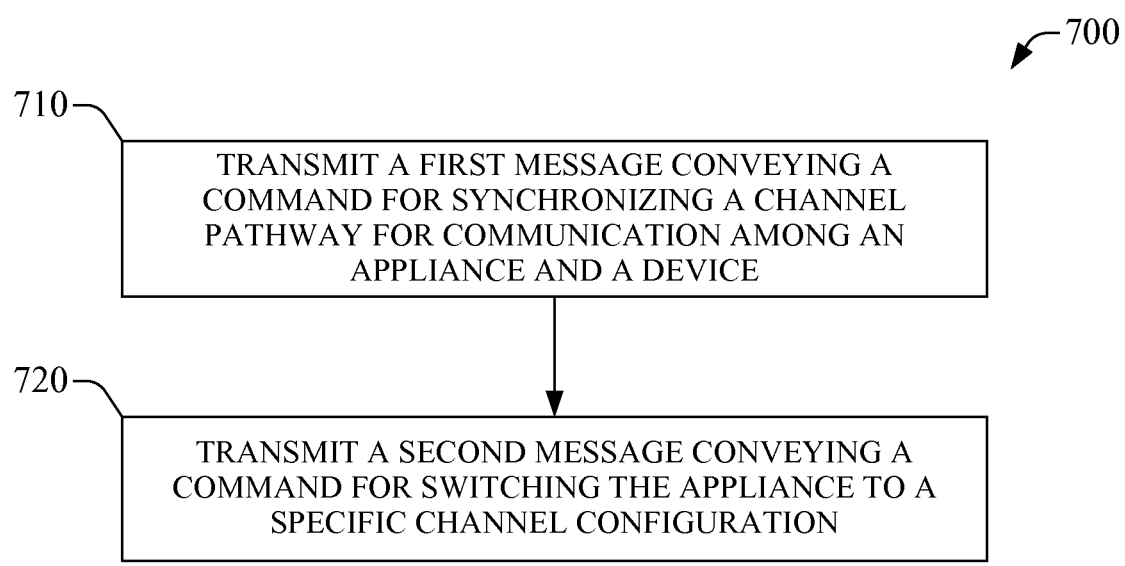
Figure 8:
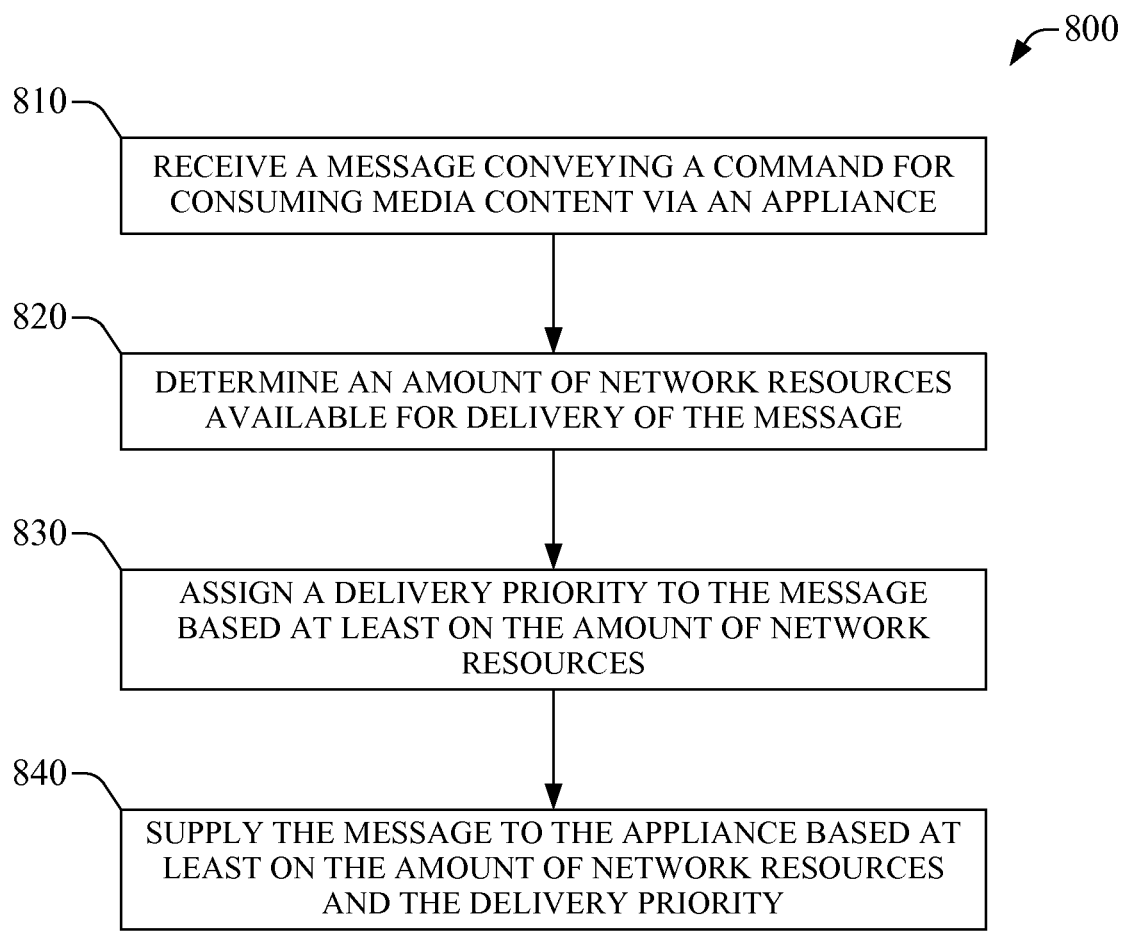

In view of the various aspects of indirect control of media consumption at an appliance described herein, exemplary methods that can be implemented in accordance with the disclosed subject matter can be better appreciated with reference to the exemplary flowcharts in FIGS. 6-8. For simplicity of explanation, the exemplary methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the subject disclosure can alternatively be represented as a series of interrelated states or events, such as in a state diagram.

The methods disclosed throughout the subject specification can be stored on an article of manufacture, such as a computer-readable storage medium, to facilitate transporting and transferring such methods to computing devices (e.g., desktop computers, mobile computers, mobile telephones, and the like) for execution, and thus implementation, by a processor or for storage in a memory.

FIGS. 6-7 are flowcharts of exemplary methods 600 and 700 for indirectly controlling media consumption in an appliance according to aspects described herein. The appliance can be a device such as CPE deployed as part of a communication network. In one or more embodiments, as described herein, the appliance (e.g., appliance 140) can be a terminal display networked in a communication network that provides a service, such as PPV programming, VOD, digital telephony, or the like. In one aspect, such terminal display can be functionally coupled to a digital terminal adaptor (DTA). In some embodiments, a device (e.g., device 110) remote from the appliance can perform (e.g., execute) the exemplary methods 600 and 700. For example, a processor of the device (e.g., device 110) or functionally coupled thereto can execute computer-executable instructions that represent such methods.

At block 610, data indicative of a plurality of assets available for consumption of media content can be acquired, e.g., retrieved or received. In a lookup scenario, the data can be received in response to a query (or a request) for availability of such assets. In one aspect, the plurality of assets comprises at least one content asset and at least one management asset. At block 620, a first message conveying a command for consuming an asset of the plurality of assets through an appliance is transmitted. In one aspect, transmitting the first message can comprise adding a first identifier (e.g., first metadata) to the first message, the first identifier indicating the first message is a control message. In another aspect, the first message can convey a request for a first data stream (e.g., a first MPEG transport stream, either a multi-program TS (MPTS) or a single-program TS (SPTS)) associated with the media content, where the request can comprise one or more of (i) a logical address (e.g., a medium access control (MAC) address, or an IP address) of the appliance and (ii) at least one of a virtual channel or a frequency carrier (e.g., in a channel plan). As described herein, the logical address can be a unique address or a non-unique address, such as an address corresponding to a group of addresses. The frequency carrier in the channel plan can be identified by a specific name within the request. In yet another aspect, the first message can convey an instruction to control a second data stream (e.g., a second MPEG transport stream, either an MPTS or a SPTS) associated with the media content. In one scenario, the instruction can be a first instruction to advance the video content related to the second data stream. In another scenario, the instruction can be a second instruction to rewind or fast forward (e.g., using trick files) the video content related to the second data stream. In yet another scenario, the instruction can be a third instruction to terminate rendering the media content (e.g., video content, audio content) related to the second data stream. In other scenarios, the instruction can be a combination of two or more of the first instruction, the second instruction, and the third instruction.

At block 630, a second message conveying a command for synchronizing a channel pathway for communication of data and/or signaling among the appliance and a device can be transmitted. As described herein, the channel pathway can comprise a virtual channel or a downstream frequency carrier in a channel plan (e.g., a predetermined non-empty set of downstream frequencies available to a service group) associated with the appliance (e.g., device 140). In one aspect, transmitting the second message can comprise adding a second identifier (e.g., second metadata) to the second message, the second identifier indicating the second message is a synchronization message.

As described herein, the order in which blocks 610 through 630 are implemented (e.g., executed) can be different from the order illustrated in FIG. 6. For example, in one scenario, the device (e.g., device 110) that can implement the exemplary method 600 can perform block 630 prior to performing block 620, thus causing the appliance to be synchronized to the device prior to such appliance receiving a command (e.g., a channel change request) to consume an asset (e.g., a PPV asset, or a VOD asset).

Regarding exemplary method 700, at block 710, a first message conveying a command for synchronizing a channel pathway for communication of data and/or signaling among the appliance and a device can be transmitted. The first channel configuration can be a first virtual channel or a first frequency carrier in a channel plan (e.g., a predetermined set of downstream frequencies available to a service group) associated with the appliance (e.g., appliance 140). As described herein, in an exemplary implementation, by synchronizing such channel pathway among the appliance and the device, data or signaling, or both, can be transmitted in-band from the device to the appliance, without reliance, for example, on transmissions in all downstream frequencies of a service group associated with the device. At block 720, a second message conveying a command for switching the appliance to a specific channel configuration can be transmitted. In view of the synchronizing step, such command can be transmitted, for example, in-band via the channel pathway as opposed to OOB or via broadcasting mode. The specific channel configuration can be a virtual channel or a frequency carrier in a channel plan (e.g., a predetermined set of downstream frequencies available to a service group) associated with the appliance.

FIG. 8 is a flowchart of an exemplary method 800 for controlling media consumption in an appliance (e.g., CPE) according to aspects described herein. In one aspect, the subject exemplary method 800 can be implemented (e.g., executed) by a network node (e.g., asset resource manager 234) that is part of a media-on-demand domain of a distribution platform (e.g., distribution platform 230) of a network provider that supplies digital service(s) comprising a variety of media assets for consumption by user device.

At block 810, a message conveying a command for consuming media content through an appliance is received. At block 820, an amount of network resources available for delivery of the message is determined. In one aspect, the amount of network resources can comprise an amount of bandwidth overhead available or allocated to a transport stream associated with a downstream frequency carrier. In another aspect, the amount of network resources can comprise a network load of messages conveying respective commands for consuming media content. In certain embodiments, the exemplary method 800 can include processing block that can comprise adjusting the amount of network resources in response to an outcome of the block 820. For instance, such adjusting action can comprise modifying encoding or compression, or both, of a plurality of transport streams being transmitted in downstream frequency channel(s). At block 830, a delivery priority is assigned to the message based at least on the amount network resources. In addition or in the alternative, the delivery priority can be assigned based on increasing network operation performance, such as reducing or minimizing total latency amongst transmitted packets. For example, since it generally takes longer to tune high-definition (HD) channels than standard-definition (SD) channels typically due to longer time between I frames, when the message is a channel change request to an HD channel (or an HD tune request), the message can be assigned higher priority than a SD tune request. Similarly, yet not identically, a channel change request to a service (e.g., linear programming) in the same frequency can take less time than channel change request to a service in a different frequency. Accordingly, when the message is a channel change request to a different frequency, the message can be assigned a higher priority than a channel change request within the same frequency. At block 840, the message is supplied to the appliance based at least on the amount of network resources and the delivery priority. As described herein, in certain scenarios the message can be supplied as part of in-band signals. Supplying the message can comprise processing and transmitting the message in accordance with aspects described herein, such as grouping a plurality of two or more messages and transmitting same.

While the systems, apparatuses, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent to those skilled in the art that various modifications and variations can be made in the subject disclosure without departing from the scope or spirit of the subject disclosure. Other embodiments of the subject disclosure will be apparent to those skilled in the art from consideration of the specification and practice of the subject disclosure as disclosed herein. It is intended that the specification and examples be considered as non-limiting illustrations only, with a true scope and spirit of the subject disclosure being indicated by the following claims.

What is claimed is:

1. A method, comprising:
    receiving, by a computing device, data indicative of a plurality of assets available for consumption, the plurality of assets comprising at least one content asset and at least one management asset, and wherein the at least one management asset allows the computing device to control navigation by a first device of the at least one content asset;
    transmitting, by the computing device, a first message comprising a command for the first device to tune to a specified downstream frequency carrier; and
    transmitting, by the computing device, a second message conveying a command for consuming, via the first device, the at least one content asset, wherein the second message is transmitted to the first device on the specified downstream frequency carrier.

2. The method of claim 1, wherein the first message conveys a command for synchronizing a channel pathway for communication among the computing device and the first device, the channel pathway comprising the specified downstream frequency carrier, wherein the specified downstream frequency carrier is in a channel plan, wherein the channel plan is part of the at least one management asset.

3. The method of claim 2, wherein transmitting the second message comprises adding a first identifier to the second message, the first identifier conveying that the second message comprises a control message.

4. The method of claim 2, wherein transmitting the first message comprises adding a second identifier to the first message, the second identifier conveying that the first message comprises a synchronization message.

5. The method of claim 1, wherein the second message conveys a request for a data stream associated with content of the at least one content asset, the at least one content asset being a linear-programming asset, and wherein the request comprises:
    a medium access control (MAC) address of the first device, and
    the specified downstream frequency carrier, wherein the specified downstream frequency carrier is in a channel plan, the at least one management asset comprising the channel plan.

6. The method of claim 1, wherein the second message conveys an instruction to control a data stream associated with content of the at least one content asset, the at least one content asset being a linear-programming asset, and wherein the instruction is part of the at least one management asset.

7. The method of claim 1, wherein the second message conveys an instruction to control a data stream associated with the at least one content asset, the at least one content asset being a non-linear asset, and wherein the instruction is part of the at least one management asset, the instruction being a first instruction to change rendering of the data stream.

8. A device, comprising:
    a memory comprising computer-executable instructions; and
    a processor functionally coupled to the memory and configured, by a first portion of the computer-executable instructions,
        to receive data indicative of a plurality of assets for consumption, the plurality of assets comprising at least one of a content asset and a management asset, and wherein the management asset allows the processor to control navigation by a first device of the content asset;
        to deliver a first message to a network component functionally coupled to the first device, the first message comprising a command for the first device to tune to a specified downstream frequency carrier, and
        to deliver a second message to the network component functionally coupled to the first device, the second message conveying a command for consuming, via the first device, the content asset, wherein the second message is delivered to the network component on the specified downstream frequency carrier.

9. The device of claim 8, wherein the first message conveys a command for synchronizing a channel pathway for communication to the first device, the channel pathway comprising the specified downstream frequency carrier, wherein the specified downstream frequency carrier is in a channel plan, and wherein the management asset comprises the channel plan.

10. The device of claim 9, wherein the processor is further configured, by a second portion of the computer-executable instructions, to compose the first message and the second message according to a protocol for packet switching.

11. The device of claim 9, wherein the processor is further configured, by a third portion of computer-executable instructions, to assign a first identifier to the first message and a second identifier to the second message, the second identifier conveying that the second message comprises a control message and the first identifier conveying that the first message comprises a synchronization message.

12. The device of claim 8, wherein the command for consuming, via the first device, the content asset comprises a request for a data stream associated with content of the content asset, the content asset being a linear-programming asset, and wherein the request comprises
    the specified downstream frequency carrier, wherein the specified downstream carrier is in a channel plan, the management asset comprising the channel plan.

13. The device of claim 8, wherein the command for consuming, via the first device, the content asset comprises an instruction to control a data stream associated with content of the content asset, the content asset being a non-linear asset, and wherein the instruction is part of the management asset, the instruction being a first instruction to change rendering of the data stream.

14. A system, comprising:
    an interface component configured to receive a first message directed to a first device, the first message comprising a command for the first device to tune to a specified downstream frequency carrier, wherein the interface component is further configured to receive a second message directed to the first device, the second message conveying a command for consuming content via the first device;

an assessment component configured to determine a first amount of network resources available for delivery of the second message; and a generation component configured to supply the second message based at least on the first amount of network resources, wherein the second message is supplied to the first device on the specified downstream frequency carrier.

15. The system of claim 14, further comprising a first network node configured to discover a service group associated with the first device and deliver the second message to the first device.

16. The system of claim 14, wherein the second message conveys a command for synchronizing a channel pathway for communication among the first device and a second device, the channel pathway comprising the specified downstream frequency carrier, wherein the specified downstream frequency carrier is in a channel plan.

17. The system of claim 16, wherein the assessment component is further configured to determine a second amount of network resources for delivery of the least one first message.

18. The system of claim 14, wherein the second message conveys a request for a data stream associated with the content, the request comprising the specified downstream frequency carrier, wherein the specified downstream frequency carrier is in a channel plan available for delivery of the content.

19. The system of claim 14, wherein the second message conveys an instruction to control a data stream associated with the content, wherein the instruction is a first instruction to change rendering of the data stream.

20. The system of claim 16, wherein the assessment component is further configured to assign a first priority to the second message and a second priority to the first message, wherein the first priority is based at least on the second message being a control message and the second priority is based at least on the first message being a synchronization message.

21. The system of claim 20, further comprising a second network node configured to:

transmit first data to the first device in accordance with the second message and in a first media format, and transmit second data to the second device in accordance with the second message and in a second media format.

* * * * *